(12) United States Patent  
Matsuoka et al.

(10) Patent No.: US 6,682,846 B2
(45) Date of Patent: Jan. 27, 2004

(54) CHARGING ELEMENT DEVICE AND HOLDING STRUCTURE THEREFOR

(75) Inventors: Toshiyuki Matsuoka, Wako (JP); Kenji Matsumoto, Wako (JP); Harumi Takedomi, Wako (JP); Osamu Hasegawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 189 days.

(21) Appl. No.: 10/020,960

(22) Filed: Dec. 19, 2001

(65) Prior Publication Data

US 2002/0076604 A1 Jun. 20, 2002

(30) Foreign Application Priority Data

Dec. 20, 2000 (JP) ........................ 2000-387752

(51) Int. Cl.$^7$ ............... H01M 2/36; H01M 2/12; H01M 2/08
(52) U.S. Cl. ............... 429/53; 429/56; 429/57; 429/72; 429/89; 429/163
(58) Field of Search ............... 429/53–57, 72, 429/89, 163, 175, 176

(56) References Cited

U.S. PATENT DOCUMENTS

| | | | | | |
|---|---|---|---|---|---|
| 4,629,622 A | * | 12/1986 | Yonezu et al. | ............ | 429/57 |
| 4,648,177 A | * | 3/1987 | Uba et al. | ............ | 29/623.2 |
| 4,722,874 A | * | 2/1988 | Marchak | ............ | 429/56 |
| 6,274,263 B1 | * | 8/2001 | Jones | ............ | 429/53 |
| 6,472,096 B2 | * | 10/2002 | Park et al. | ............ | 429/73 |
| 6,562,508 B1 | * | 5/2003 | Satoh et al. | ............ | 429/53 |

* cited by examiner

Primary Examiner—Stephen Kalafut
Assistant Examiner—Tracy Dove
(74) Attorney, Agent, or Firm—Sughrue Mion, PLLC

(57) ABSTRACT

A charging element device comprises a positive electrode terminal and a negative electrode terminal which are located at one end of a cylindrical battery case having a positive electrode and a negative electrode equipped therein and which are respectively connected to the positive electrode and the negative electrode, with an electrolyte solution charging opening being formed at the other end of the battery case. The electrolyte solution charging opening is sealed by a plug having a safety valve, and the safety plug reduces an inner pressure of the battery case when the inner pressure is not less than a predetermined pressure.

5 Claims, 6 Drawing Sheets

US 6,682,846 B2

CHARGING ELEMENT DEVICE AND HOLDING STRUCTURE THEREFOR

BACKGROUND OF THE INVENTION

1. Technical Field

The present invention relates to a charging element device equipped in electric cars, hybrid electric cars, and the like, as a driving power supply. The invention relates to any type of charging element device, including cells such as nickel hydrogen battery and lithium batteries and energy storage devices such as double layered capacitors (ultra-capacitors).

2. Background Art

With respect to this type of charging element device, a conventional one is generally known in which an inner element having a positive electrode and a negative electrode is housed in a battery case with a positive electrode terminal and a negative electrode terminal being installed through current collector plates connected to the respective electrodes of the inner element. Such charging element devices are classified to those in which the positive and negative terminals are divided and located on the respective ends of the battery case and those in which the terminals are collectively located on one end. Furthermore, an electrolyte solution is sealed in the battery case and a safety valve is located so as to prevent the battery case from rupturing. For example, in charging or discharging, the generated gas becomes excessive to increase the inner pressure, the safety valve breaks, thereby preventing the battery case from rupturing.

Conventionally, in those charging element devices with the positive and negative terminals being located at both ends in a divided manner, an electrolyte solution inlet and the safety valve are formed on one end. Moreover, in those charging element devices with the positive and negative terminals being collectively located on one end, some of them have the electrolyte solution inlet and the safety valve on the terminal side, and others have the electrolyte solution inlet on the terminal side with the safety valve being located on the other side.

FIG. 7 shows an example of the conventional charging element device in which the positive and negative terminals are collectively located on one end of a battery case with the electrolyte solution inlet and the safety valve being located on the terminal side. In this Figure, reference numeral 100 is a cylindrical battery case with a bottom, 101 is an inner element having positive and negative electrodes with current collector plates 102, 103 being connected to these electrodes, 104 is a sealing plate with a positive terminal 105, a negative terminal 106 and a safety valve 107 located therein. This charging element device is assembled such that: the inner element 101 is housed inside the battery case 100; an electrolyte solution is charged into the battery case 100 through an opening of the battery case 100; the sealing plate 104 is set on the opening of the battery case 100 with the respective terminals 105, 106 being connected to the current collector plates 102, 103; and the circumference of the opening of the battery case 100 is crimped over the sealing plate 104. In this case, the opening of the battery case 100 serves as the electrolyte solution inlet, and the opening is sealed by the sealing plate 104.

In the charging element device shown in FIG. 7, when the safety valve 107 is activated and opened with the electrolyte solution leaking therefrom, the electrolyte solution flows over the positive and negative terminals 105 and 106, and tends to cause short-circuiting via the electrolyte solution. Reference numeral L shows such an electrolyte solution short-circuiting the terminals 105 and 106. This short-circuiting may also occur if the electrolyte solution leaks from the opening of the battery case.

Moreover, in the case of the charging element device in which the electrolyte solution inlet is located at the terminal side and the safety valve is located on the other side, most of those element devices have a construction in which one portion of the bottom of the battery case 100, as shown in FIG. 7, is formed as a thin portion which serves as a safety valve. However, in such cases, the battery case 100 comes to rupture, resulting in a difficulty in controlling the electrolyte solution leaking and scattering, and consequently causing damages to peripheral devices by the scattering electrolyte solution.

SUMMARY OF THE INVENTION

Therefore, an objective of the present invention is to provide a charging element device and a holding structure therefore, which can prevent terminals from short-circuiting due to leaked electrolyte solution, and deal with the leaked electrolyte solution safely without scattering over peripheral devices.

The present invention provides a charging element device comprising: a positive electrode terminal and a negative electrode terminal which are located at one end of a cylindrical battery case having a positive electrode and a negative electrode equipped therein and which are respectively connected to the positive electrode and the negative electrode, with an electrolyte solution charging opening being formed at the other end of the battery case. The electrolyte solution charging opening is sealed by a plug having a safety valve, and the safety plug reduces an inner pressure of the battery case when the inner pressure is not less than a predetermined pressure.

In accordance with the charging element device of the present invention, the electrolyte solution charging opening and the safety valve which tend to have a leakage of the electrolyte solution and the terminals are located at different ends in a divided manner. Therefore, the terminals are free from short-circuiting by the electrolyte solution leaking from the electrolyte solution charging opening and the safety valve.

The present invention further provides a holding structure for the above-mentioned charging element device, which houses the charging element device inside an external case and holding it therein. The charging element device is supported in a condition in which the charging element device is located in the external case with the plug facing downward, and an electrolyte solution discharging path, which is isolated from the charging element device and is communicated with the inside of the battery case when the safety valve is opened, is provided in the external case.

In accordance with the holding structure for the charging element device of the present invention, the plug provided with the safety valve is located downward. Therefore, when the safety valve is activated and opened, the lea king electrolyte solution flows downward. When the electrolyte solution leaks, it flows into the electrolyte solution discharging path. Since the electrolyte solution discharging path is isolated from the charging element device, the electrolyte solution does not adhere to the terminals, thereby making it possible to prevent short-circuiting between the terminals as well as scattering of the solution over peripheral devices, and consequently to safely dispose of the electrolyte solution.

In the above-mentioned holding structure of the present invention, it is preferable to provide an arrangement in which an electrolyte solution discharging path is provided with an electrolyte solution detecting device for detecting the electrolyte solution. Since the electrolyte solution is detected by the electrolyte solution detecting device, the safety valve is activated, namely, it is recognized an abnormal state of the charging element device, so that it is possible to exchange charging element device quickly.

Moreover, in the above-mentioned holding structure of the present invention, it is preferable to provide an arrangement in which a plurality of charging element devices are supported inside the external case while being series-connected to one after another, and electrolyte solution discharging paths are formed in the respective charging element devices. In this case, the plurality of charging element devices are series-connected to form a charging element module, and this module is held inside the external case. With an arrangement in which the electrolyte solution discharging paths are formed in the respective charging element devices with the electrolyte solution detecting device being located in these electrolyte discharging paths, it is possible to detect which charging element device has an activated safety valve, and consequently to provide an easier exchanging job.

Moreover, the present invention is designed to allow the electrolyte solution detecting device to release a detection signal (for example, an electric signal) upon detection of the electrolyte solution, and is more preferably provided with a warning device for giving a warning sign upon receipt of the detection signal. For example, in the case when the charging element device of the present invention is installed in an electric car or a hybrid electric car or the like as a driving power supply, the warning device serves as a device for providing a warning to the driver, which is constituted by lamps on the meter panel, buzzers, etc. In this arrangement, the user is, at once, informed of the fact that the safety valve is activated, that is, an abnormal state of the charging element device, so that it is possible to exchange charging element devices quickly.

DESCRIPTION OF THE PREFERRED EMBODIMENTS

Figure 1:
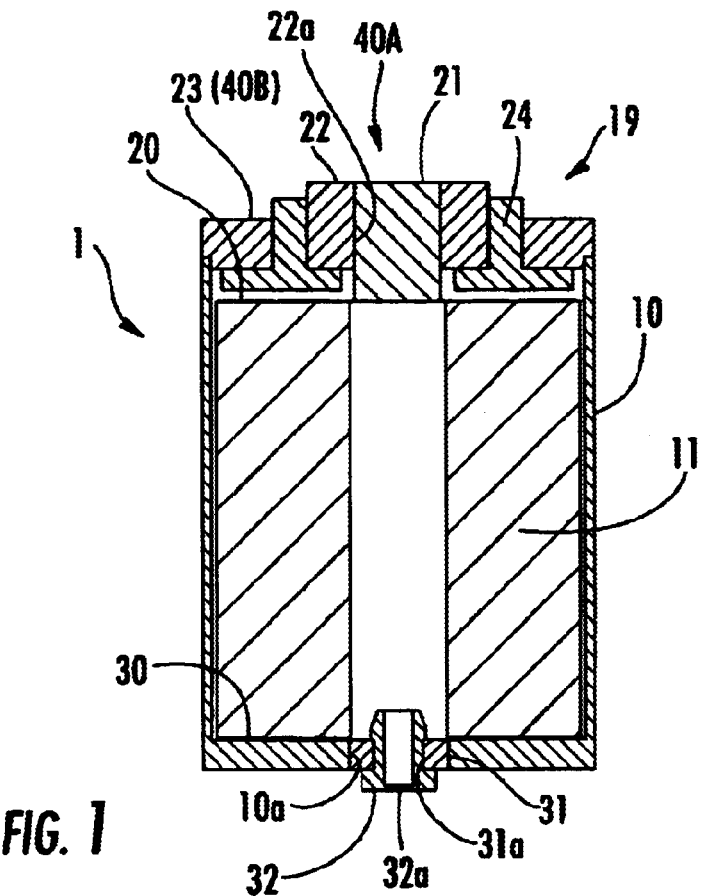
FIG. 1 is a longitudinal cross-sectional view that shows a charging element device in accordance with one embodiment of the present invention.
Figure 2:
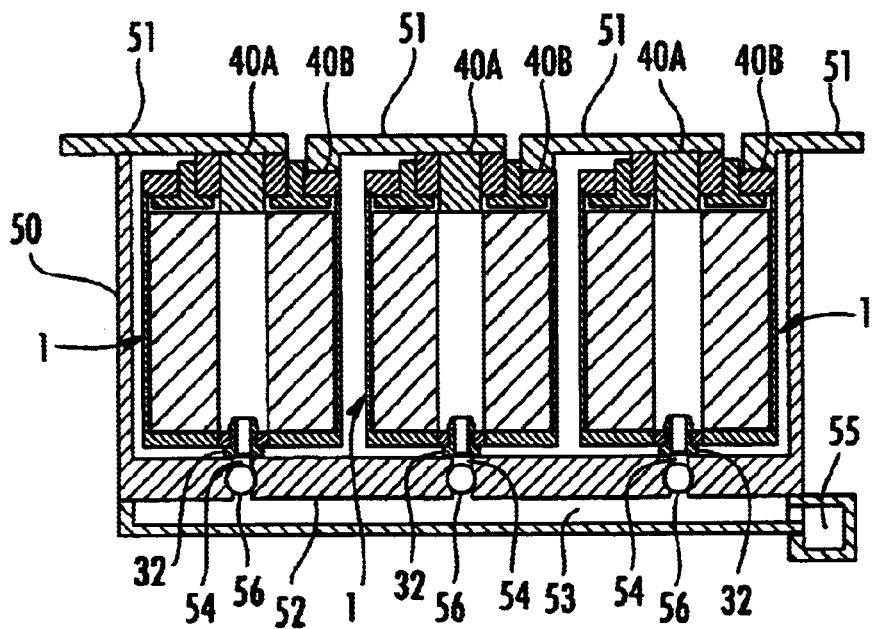
FIG. 2 is a longitudinal cross-sectional view that shows a holding structure of the charging element device in accordance with the embodiment of the present invention.

Referring to FIGS. 1 and 2, an explanation will be given of preferred embodiments of the present invention.

FIG. 1 is a longitudinal cross-sectional view of a charging element device 1 in accordance with one preferred embodiment, and in this Figure, reference numeral 10 is a metallic battery case having a cylindrical shape with a bottom in the center of which a through hole 10a is formed, and 11 is an inner electrode housed inside the battery case 10. The inner electrode 11 is formed into a cylindrical shape with flexible positive electrode plate and negative electrode plate being wound up in a spiral shape with an insulating separator (none of them shown) being interpolated in between; thus, with respect to the insulating separator, the positive electrode plate is located on an upper side, and the negative electrode plate is located on a lower side, in a manner so as to be offset from each other. Then, a positive-electrode side current collector plate 20 is joined to the upper end of the positive electrode plate, and a negative-electrode side current collector plate 30 is joined to the lower end of the negative electrode plate.

The negative-electrode side current collector plate 30 is joined to the bottom face of the inner electrode 11, and a ring-shaped protrusion 31 is formed in the center thereof. The through hole 10a of the bottom of the battery case 10 is sealed by this protrusion 31. The protrusion 31 of the negative-electrode side collector plate 30 has a through hole serving as an electrolyte solution charging opening 31a, and this electrolyte solution charging opening 31a is sealed with a plug 32. This plug 32, which has a cylinder shape with one end being plugged with a thin safety valve 32a, is pushed into the electrolyte solution charging opening 31a from the end on the opening side so as to be attached to the protrusion 31.

The opening on the upper end side of the battery case 10 is sealed with a sealing plate 19. This sealing plate 19 is constituted by a positive-electrode-side ring 22 located inside and a negative-electrode-side ring 23 located outside both of which are made of metal, and an insulating ring 24 interpolated between these rings 22 and 23, which are integrally coupled to one after another, and the negative-electrode-side ring 23 is joined to the circumference of the opening of the battery case 10. A protrusion 21, formed in the center of the positive-electrode-side current collector plate 20, is fitted to the positive-electrode-side ring 22. In the present charging element device 1, the protrusion 21 and the positive-electrode-side ring 22 of the positive-electrode-side current collector plate 20 are allowed to form a positive terminal 40A, and the negative-electrode-side ring 23, connected to the negative-electrode-side current collector plate 30 through the battery case 10, is allowed to form a negative terminal 40B.

The above-mentioned charging element device 1 is assembled in the following manner. First, the positive-electrode-side and negative-electrode-side current collector plates 20, 30 are respectively joined to the ends of the inner electrode 11, and this is housed inside the battery case 10, with the protrusion 31 of the negative-electrode-side current collector plate 30 being fitted to the through hole 10a and the protrusion 31 and the battery case 10 being connected to each other so as to allow the solution to be filled therein. Next, the protrusion 21 of the positive-electrode-side current collector plate 20 is fitted to the through hole 22a of the inside ring 22 of the sealing plate 19, and this protrusion 21, the inside ring 22 and the outside ring 23 are joined to the peripheral circumference of the opening of the battery case 10 so as to allow the solution to be filled therein. Next, an electrolyte solution is charged into the battery case 10 from the electrolyte solution charging opening 31a, and the electrolyte solution charging opening 31a is sealed with the plug 32.

In accordance with the above-mentioned charging element device 1, in such a case when gas, generated inside the battery case 10 at the time of charging or discharging, becomes excessive, the safety valve 32a is allowed to rupture by the inner pressure to open and leak the gas outside, thereby preventing the battery case 10 from rupturing. Since this safety valve 32a is installed on the end on the side opposite to the side on which the positive and negative terminals 40A, 40B are formed, the terminals 40A and 40B are free from short-circuiting due to the electrolyte solution leaking from the safety valve 32a. Moreover, if by any chance the electrolyte solution should leak from the electrolyte solution charging opening 31a, the terminals 40A and 40B are free from short-circuiting since the electrolyte solution charging opening 31a is also located on the end on the side opposite to the terminals 40A and 40B in the same manner as the safety valve 32a.

Next, referring to FIG. 2, an explanation will be given of a preferred embodiment having a structure in which a plurality of charging element devices 1 are held.

In FIG. 2, reference numeral 50 is an external case having a rectangular parallelepiped shape, and inside this external case 50, a plurality of (three in the Figure) of the above-mentioned charging element devices 1 are located in parallel with each other. These charging element devices 1 are longitudinally located with the end on the terminals 40A and 40B side facing upward and the plug 32 facing downward, and supported by a supporting member, not shown. Here, the respective charging element devices 1 are series-connected by a plurality of bus bars 51 that are alternately connected to the positive and negative terminals 40A and 40B so as to form a module.

A partition plate 52 is located on the bottom of the external case 50 so that a space below this partition plate 52 forms an electrolyte solution recovering path 53. Moreover, electrolyte solution discharging holes (electrolyte solution discharging paths) 54, which correspond to the respective charging element devices 1, are formed on the partition plate 52. These electrolyte solution discharging holes 54 communicate with the electrolyte solution recovering path 53, and are also allowed to communicate with the inside of the battery case 10 in a state where the safety valve 32a of the charging element device 1 is opened. The electrolyte solution recovering path 53 and the electrolyte solution discharging holes 54 are isolated from the charging element devices 1 so that the electrolyte solution flowing through these does not come into contact with the charging element devices 1. Moreover, the external case 50 is provided with a reserving section 55 in which the electrolyte solution flowing through the electrolyte solution recovering path 53 flows and is held. Here, in the example shown by the Figure, the partition plate 52 is integrally formed with the external case 50; however, this may be formed in a separate manner, and in this case, the electrolyte solution recovering path 53 is integrally formed with the external case 50.

Each of the electrolyte discharging holes 54 formed in the partition plate 52 is provided with an electrolyte solution detecting device 56 for detecting the electrolyte solution. With respect to the electrolyte solution detecting device 56, such a device that transmits an electric signal upon contact with the electrolyte solution, is preferably used. Here, in the case when the present device is installed as a motor driving power supply for, for example, a hybrid electric car, a warning device for giving a warning signal from the electrolyte solution detecting device 56 may be installed therein. In this case, the warning device is constituted by lamps on the meter panel or buzzers, etc.; therefore, for example, an electric signal from the electrolyte solution detecting device 56 is supplied to an ECU (electric control unit) for controlling the states of a driving power supply (current, voltage, temperature, etc.) so that the ECU is allowed to activate the warning device. With respect to another example of the electrolyte detecting device 56, paper, etc. impregnated with a reagent that discolors upon contact with the electrolyte solution may be used. Here, the electrolyte solution detecting device 56 is designed so as not to plug the electrolyte discharging paths 54.

In the above-mentioned holding structure of the charging element devices, the electrolyte solution detecting device 56 detects the fact that the safety valve 32a is activated, that is, an abnormal state of the charging element device 1, so that it is possible to exchange the charging element devices quickly. The electrolyte solution detecting device 56 is located in each of the electrolyte solution discharging holes 54 that is formed in each of the charging element devices 1; therefore, it is possible to confirm which charging element device 1 has an activated safety valve 32a, and consequently to carry out the exchanging job easily. Moreover, the application of the arrangement in which the warning device for giving a warning sign upon receipt of the detection signal from the electrolyte solution detecting device 56 makes it possible to immediately inform the user of the fact that there is any abnormality in the charging element device.

Moreover, the plug 32 provided with the safety valve 32a is allowed to face downward; therefore, when the safety valve 32a is activated to open, the leaking electrolyte solution is allowed to flow downward. Upon leaking out, the electrolyte solution flows into the electrolyte solution discharging holes 54, then falls downward to the electrolyte solution recovering path 53, and is finally allowed to flow into the reserving section 55. Since the electrolyte solution discharging holes 54 and the electrolyte solution recovering path 53 are isolated from the respective charging element devices 1, it is possible to prevent the electrolyte solution from adhering to the terminals 40A and 40B. Consequently, it becomes possible to prevent short-circuiting of the terminals 40A and 40B as well as scattering of the electrolyte solution outside the external case 50 and the subsequent adverse effects on the peripheral devices, and also to process the electrolyte solution safely.

Figure 3:
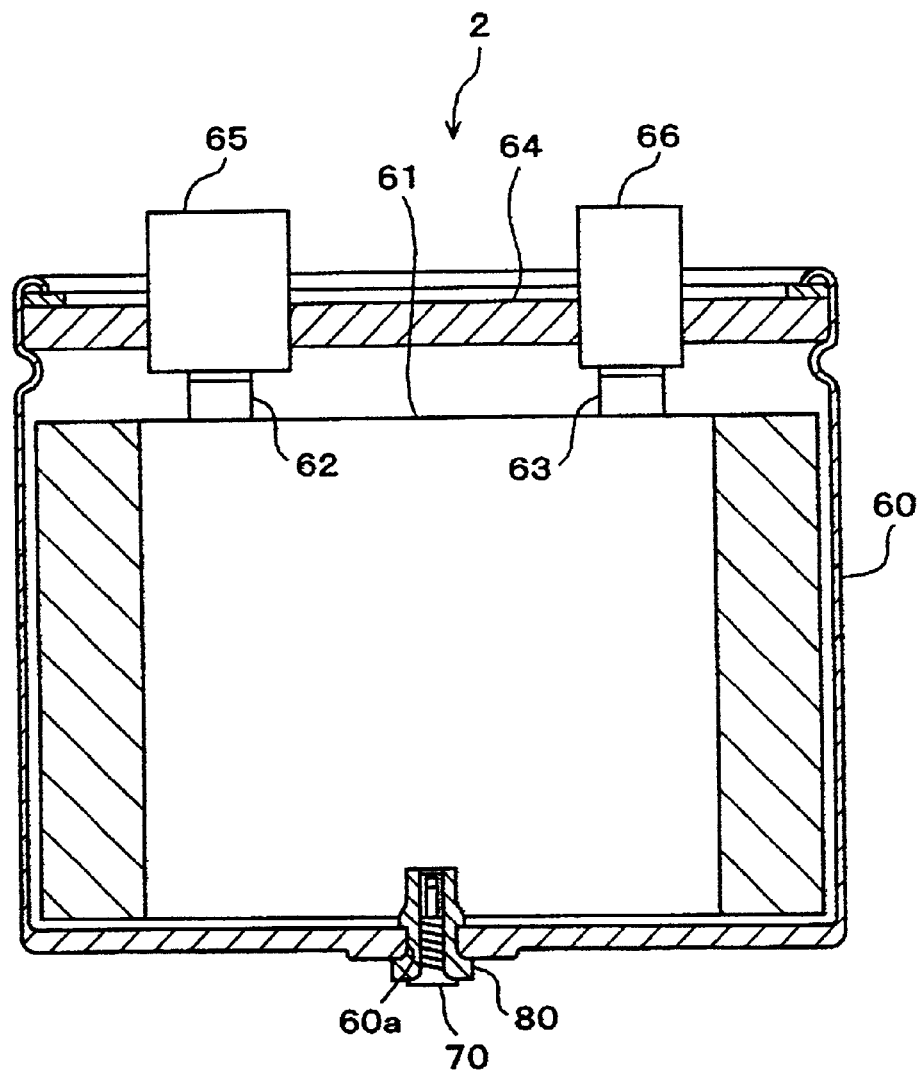
FIG. 3 is a longitudinal cross-sectional view in accordance with another embodiment of the present invention.
Figure 4:
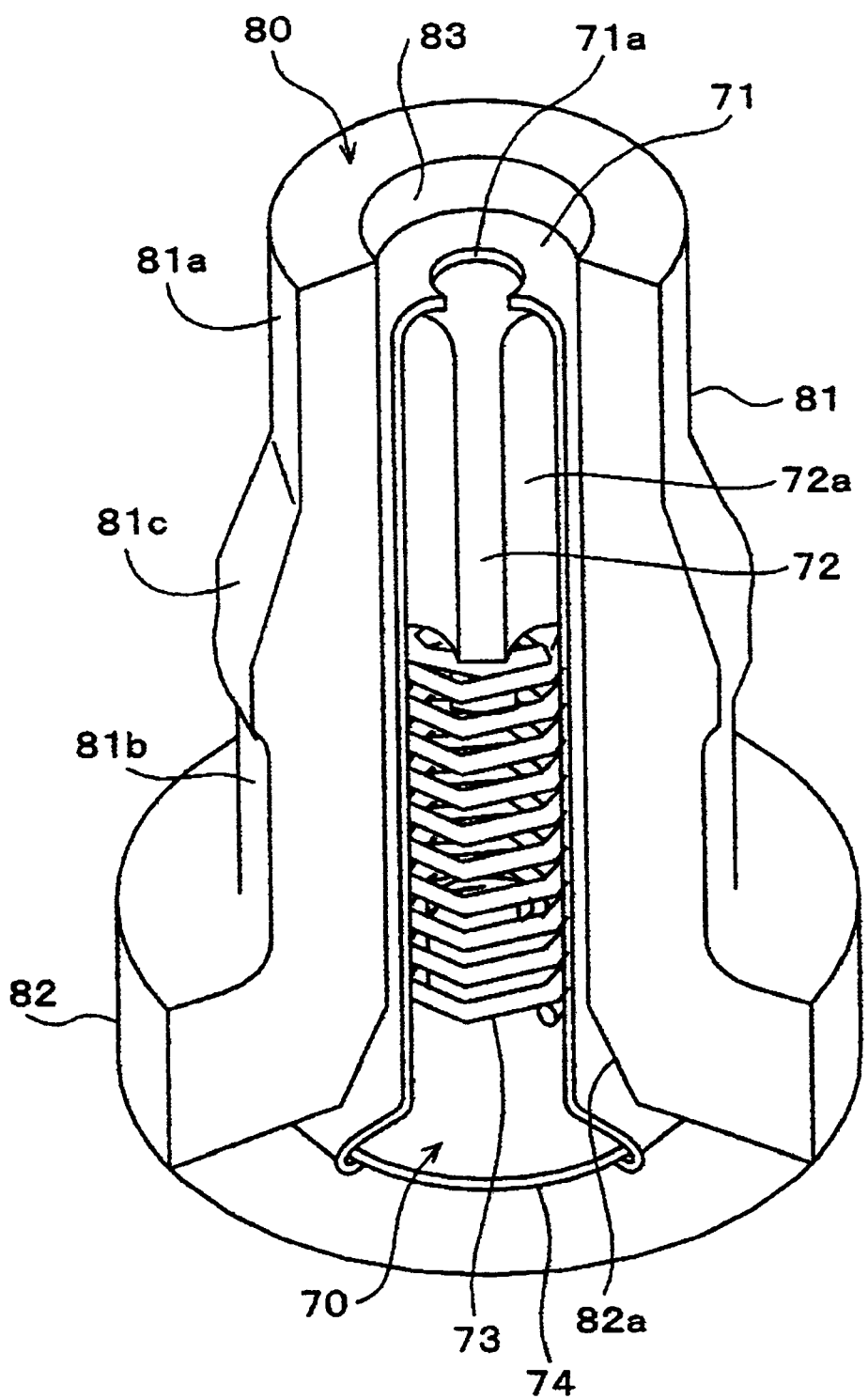
FIG. 4 is a perspective longitudinal cross-sectional view that partially shows a safety valve and a solution plug in accordance with the above-mentioned embodiment of the present invention.

Referring to FIGS. 3 and 4, an explanation will be given of another preferred embodiment of a charging element device.

FIG. 3 is a longitudinal cross-sectional view of a charging element device 2 in accordance with another preferred embodiment, and reference numeral 60 is a metal battery case having a cylinder shape with a bottom in the center of which a through hole 60a is formed, and 61 is an inner electrode having a cylinder shape, housed inside the battery case 60. On the upper end of the inner electrode 61, a positive-electrode-side current collector plate 62 and a negative-electrode-side current collector plate 63, which are joined to a positive-electrode plate and a negative-electrode plate (none of them shown) that are provided in the inner electrode 61, are respectively located. Reference numeral 64 is a sealing plate for sealing the opening of the battery case 60, and the sealing plate 64 is caulked and joined to the circumference of the opening of the battery case 60. A positive-electrode terminal 65 and a negative-electrode terminal 66, which stick upward, are located on the sealing plate 64. These terminals 65, 66 are respectively connected to the positive-electrode-side current collector plate 62 and the negative-electrode-side current collector plate 63 by caulking and joining the sealing plate 64 on the battery case 60.

The through hole 60a in the bottom of the battery case 60 is sealed with a cylindrical rubber solution plug 80 having a safety valve 70 installed therein. As illustrated in FIG. 4, the solution plug 80 is constituted by a cylinder section 81 and a flange portion 82 formed on the lower end thereof, and the safety valve 70 is inserted in its void section (electrolyte solution charging opening) 83. An opening on the flange portion 82 side of the cylinder section 81 has a taper portion 82a so as to allow the safety valve 70 to be easily inserted, and the inner diameter is uniform except for this portion. The outer diameter of a top portion 81a of the cylinder section 81 is virtually the same as the inner diameter of the through hole 60a, with a base end 81b on the flange portion 82 being thicker than the top portion 81a Here, a swelling portion 81c for coming-off preventing use is formed between the top portion 81a and the base end 81b.

The safety valve 70 has an arrangement wherein a rubber packing (plug) 72 and a coil spring 73 are located from above into a cylindrical case 71 provided with a gas discharging opening 71a on its upper end, and a lid 74 is caulked and joined to the lower end of the case 71. The coil spring 73 is in a compressed state in which the packing 72 is always pressed upward with the lid 74 serving as a spring base. The packing 72, which is a rubber molded member having a virtually column shape, has a circumferential face on which a plurality of grooves 72a extending in the axis direction are formed with equal intervals. The packing 72 is housed inside the case 71 so as to freely shift in the axis direction; however, since it is pressed by the coil spring 73 so that it normally comes into contact with the upper end of the case 71. Thus, the gas discharging opening 71a is sealed with the packing 72. When the packing 72 is depressed against the elastic repulsive force of the coil spring 73, the gas discharging opening 71a is opened, and allowed to communicate with a space between the packing 72 and the lid 74 through the groove 72a.

In order to attach the solution plug 80 and the safety valve 70 to the opening 60a of the battery case 60, first, the solution plug 80 is inserted into the opening 60a on the top portion 81a side, so as to push the swelling portion 81c to the inside of the battery case 60, thereby allowing the flange portion 82 to contact the bottom face of the battery case 60. Next, the safety valve 70 is inserted to the solution plug 80 from the end on the gas discharging opening 71a side. In this case, when the safety valve 70 is inserted to the solution plug 80, the base end 81b of the solution plug 80 is sandwiched between the inner circumferential face of the opening 60a and the safety valve 70, and compressed so that it comes to have an increased rigidity; thus, the safety valve 70 is press-inserted into the solution plug 80, while the solution plug 80 is press-inserted into the opening 60a. Consequently, it is possible to positively prevent both of the members from coming off.

The above-mentioned charging element device 2 is assembled in the following manner. First, the positive-electrode side and negative-electrode side current collector plates 62, 63 are respectively joined to the inner electrode 61, and this is housed inside the battery case 60. Next, with the sealing plate 64 being located on the opening of the battery case 60, the positive electrode terminal 65 and the negative electrode terminal 66 are connected to the respective current collector plates 62, 63, and the sealing plate 64 is caulked and joined to the circumference of the opening of the battery case 60. Next, the solution plug 80 is inserted into the opening 60a of the battery case 60, and after an electrolyte solution has been charged inside the battery case 60 from the void section 83 of the solution plug 80, the safety valve 70 is press-inserted into the void section 83 of the solution plug 80.

In accordance with the above-mentioned charging element device 2, when the inner pressure of the battery case 60 increases due to gas generated therein to exceed the elastic repulsive force of the coil spring 73, the coil spring 73 is depressed by the packing 72 to shrink; thus, the gas is discharged into the case 71 from the opened gas discharging opening 71a. When the inner pressure of the battery case 60 is returned to its original state, the packing 72 is raised by the coil spring 73, thereby closing the gas discharging opening 71a.

In the present preferred embodiment, both of the safety valve 70 and the solution plug 80 in which the safety valve 70 is press-inserted are located on the end opposite to the side on which the positive and negative terminals 65, 66 are installed; therefore, even if the electrolyte solution leaks from the opening 60a of the battery case 60 in which the safety valve 70 or the solution plug 80 has been press-inserted, the terminals 65, 66 are free from short-circuiting by the electrolyte solution. Moreover, since coaxial one unit is formed by the safety valve 70 and the solution plug 80, it is possible to have a higher degree of freedom in the layout on the bottom of the battery case 60, and consequently to easily arrange them without any difficulty even when the diameter of the battery case 60 is small. The opening and closing operations of the safety valve 70 are carried out by the elastic repulsive force of the coil spring 73 that exerts a pressure thereon; thus, it is possible to ensure the operation and also to stabilize the operation for a long time. Moreover, the pressure adjustment as to how much pressure is applied to open the valve is easily carried out by exchanging the coil spring to another one having a different elastic repulsive force.

Figure 5:
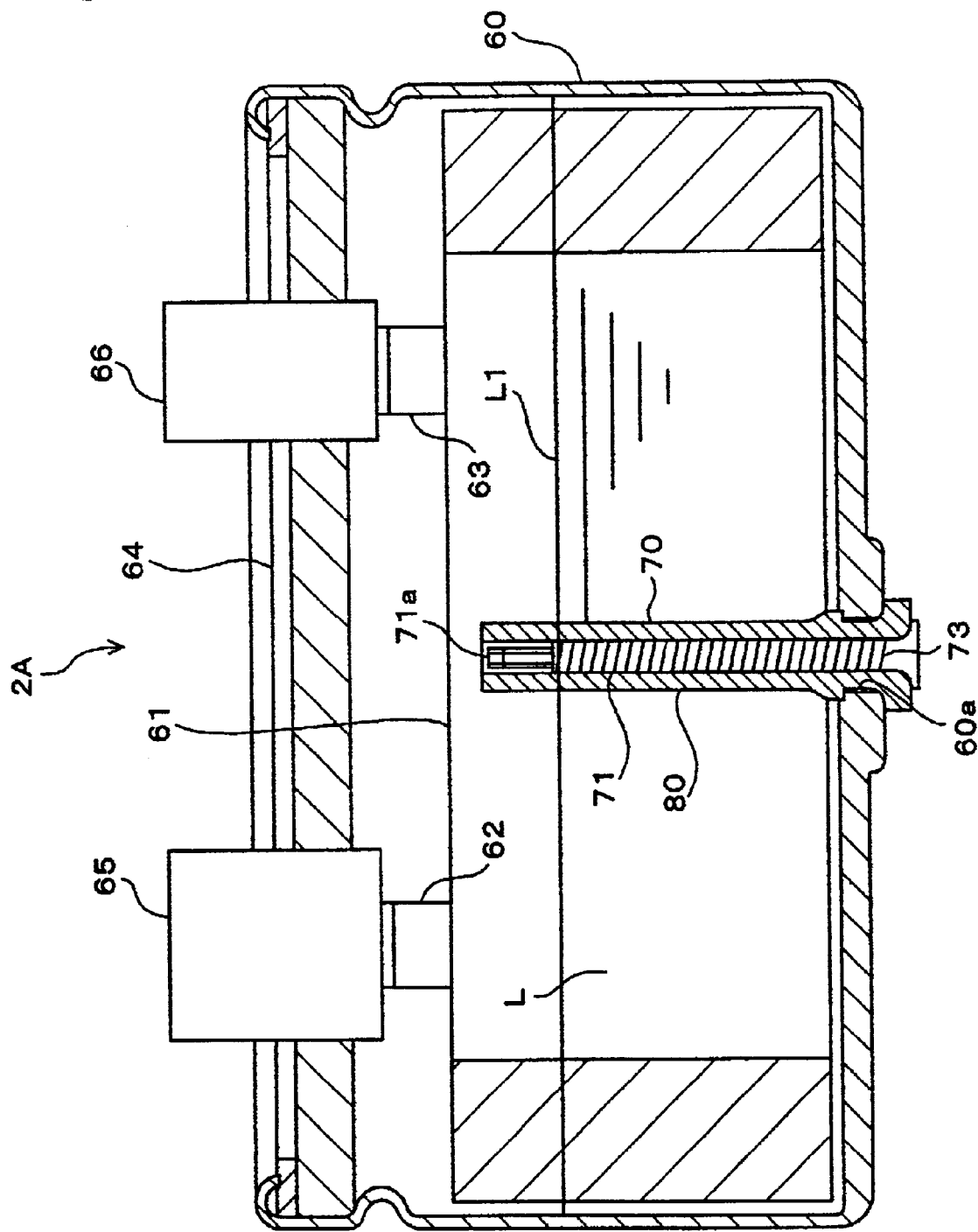
FIG. 5 is a longitudinal cross-sectional view that shows a modified example of the charging element device in accordance with the above-mentioned embodiment of the present invention.

FIG. 5 shows a modified example of the above-mentioned charging element device 2. This charging element device 2A is arranged so that the length of the solution plug 80 is set to be longer with the result that its upper end sticks out from the liquid face $L_1$ of the electrolyte solution L that is charged into the battery case 60, and the case 71 of the safety valve 70 and the coil spring 73 are also set to be longer correspondingly; therefore, the gas discharging opening 71a of the case 71 is located above the liquid face $L_1$ of the electrolyte solution $L_1$. With this arrangement, even when the safety valve 70 is activated to open the gas discharging opening 71a of the case 71, the electrolyte solution L is less susceptive to leakage.

Next referring to FIG. 6, an explanation will be given of a preferred embodiment having a structure for holding a plurality of charging element devices. 2.

Figure 6:
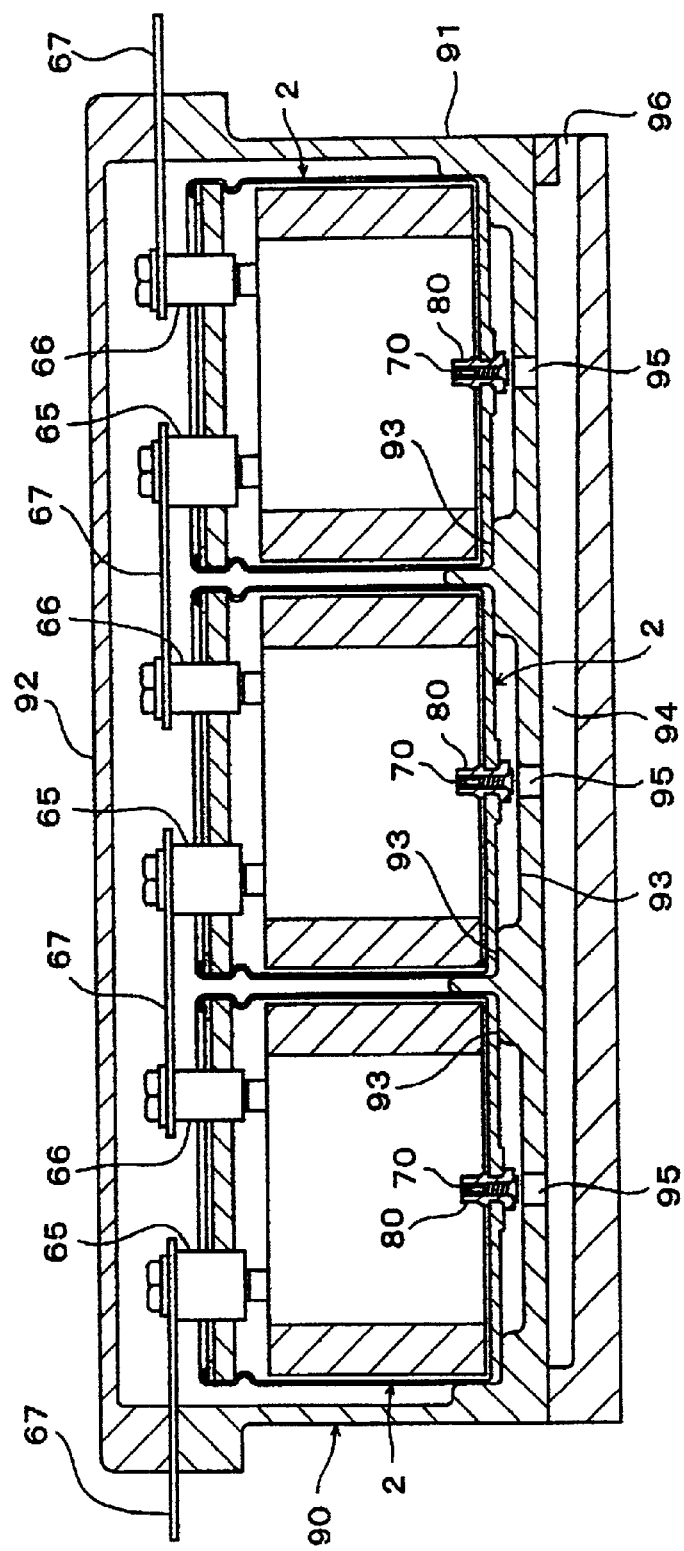
FIG. 6 is a longitudinal cross-sectional view that shows a holding structure of the charging element device in accordance with the above-mentioned embodiment of the present invention.
Figure 7:
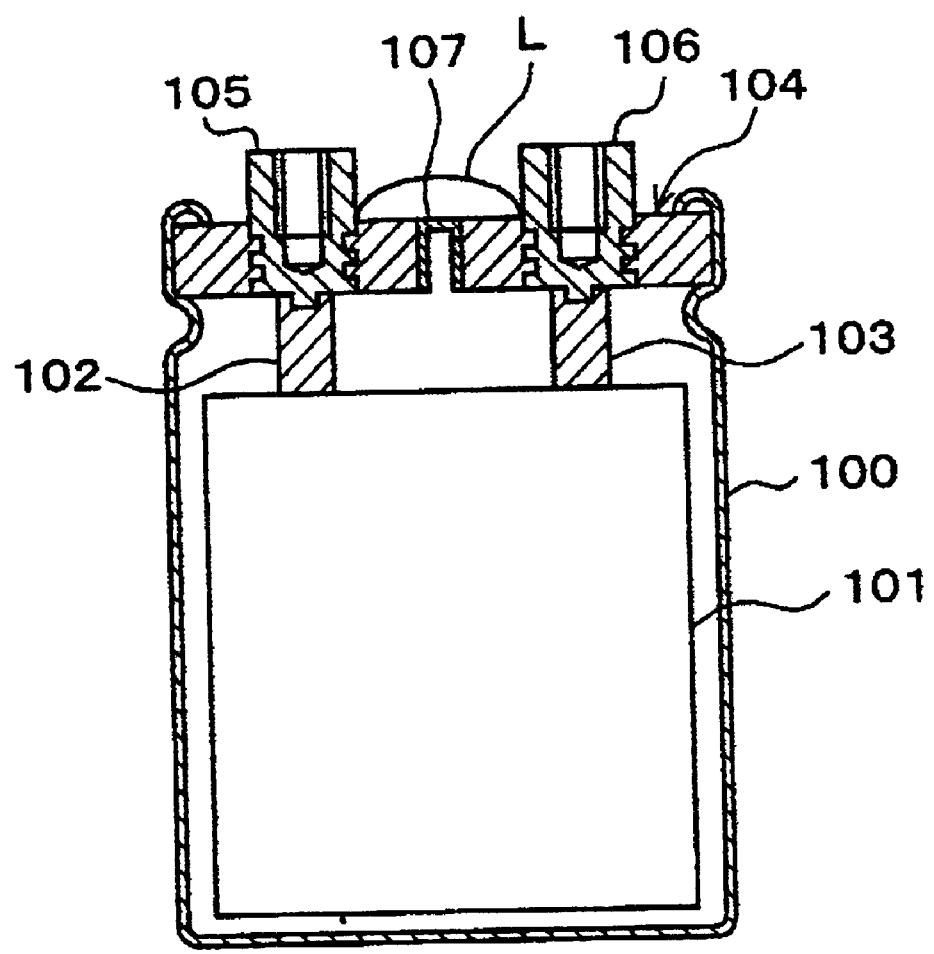
FIG. 7 is a longitudinal cross-sectional view that shows one example of a conventional charging element device.

In FIG. 6, reference numeral 90 is an external case having a rectangular parallelepiped shape, and inside this external case 90, a plurality of (three in the Figure) charging element devices 2 are located side by side. These charging element devices 2 are series-connected by a plurality of bus bars 67 alternately connected to the positive and negative terminals 65, 66 to form a module. The external case 90 is constituted by a case main body 91 and a lid 92, and the end portions of bus bars 67, connected to the charging element devices 2 located on both of the ends, are located outside the external case 90 while being sandwiched by the case main body 91 and the lid 92.

A partition plate 93 is located on the bottom of the case main body 91, and the respective charging element devices 2 are fitted to fitting sections 93a formed in the partition plate 93. A space below the partition plate 93 forms an electrolyte solution recovering path 94, and an electrolyte solution discharging hole (electrolyte solution discharging path) 95 is formed right under the safety valve 70 attached to the respective charging element devices 2 on the partition plate 93. The bottom face of the electrolyte solution recovering path 94, that is, the bottom face of the case main body 91, is inclined to form a downward slope in one direction (rightward in FIG. 6), and a discharging opening 96 is formed in the top end.

In accordance with the holding structure of the charging element device of the present embodiment, in the case when the safety valve 70 of the charging element device 2 is activated and opened, causing the electrolyte solution to leak outside, the electrolyte solution is allowed to fall on the electrolyte solution recovering path 94 through the electrolyte solution discharging hole 95, and is finally discharged from the discharging opening 96. Since the electrolyte solution discharging hole 95 and the electrolyte solution recovering path 94 are isolated from the respective terminals 65, 66 and the respective bus bars 67 by the charging element devices 2 so that it is possible to prevent the electrolyte solution from adhering to these members, and consequently to process the electrolyte solution safely without any short-circuiting between the terminals 65, 66.

It should be noted that the present embodiment is of course provided with the electrolyte solution detecting device for detecting the electrolyte solution that is attached to the respective electrolyte solution discharging openings 95 so as to manage the state of the charging element devices 2 in the same manner as the holding structure shown in FIG. 2.

What is claimed is:

1. A charging element device comprising:
    a positive electrode terminal and a negative electrode terminal which are located at one end of a cylindrical battery case having a positive electrode and a negative electrode equipped therein and which are respectively connected to the positive electrode and the negative electrode, with an electrolyte solution charging opening being formed at the other end of the battery case,
    wherein the electrolyte solution charging opening is sealed by a plug having a safety valve, and
    the safety plug reduces an inner pressure of the battery case when the inner pressure is not less than a predetermined pressure.

2. A holding structure for the charging element device disclosed in claim 1, which houses the charging element device inside an external case and holding it therein,
    wherein the charging element device is supported in a condition in which the charging element device is located in the external case with the plug facing downward, and an electrolyte solution discharging path, which is isolated from the charging element device and is communicated with the inside of the battery case when the safety valve is opened, is provided in the external case.

3. A holding structure for a charging element device according to claim 2, wherein the electrolyte solution discharging path is provided with an electrolyte solution detecting device for detecting the electrolyte solution.

4. A holding structure for a charging element device according to claim 2, wherein a plurality of charging element devices are supported inside the external case while being series-connected to each other, and the electrolyte solution discharging path is formed in the respective charging element devices.

5. The holding structure for a charging element device according to claim 3, wherein the electrolyte solution detecting device outputs a detection signal upon detection of the electrolyte solution, and is provided with a warning device for providing a warning sign upon receipt of the detection signal.

* * * * *